United States Patent
Kolze et al.

(10) Patent No.: US 7,327,809 B2
(45) Date of Patent: Feb. 5, 2008

(54) CHANNEL EQUALIZATION WITH SCDMA MODULATION

(75) Inventors: Thomas J. Kolze, Phoenix, AZ (US); Bruce J. Currivan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 707 days.

(21) Appl. No.: 10/136,061

(22) Filed: Apr. 30, 2002

(65) Prior Publication Data

US 2002/0186756 A1 Dec. 12, 2002

Related U.S. Application Data

(63) Continuation-in-part of application No. 10/000,415, filed on Nov. 20, 2001.

(60) Provisional application No. 60/296,884, filed on Jun. 8, 2001.

(51) Int. Cl.
*H04L 27/06* (2006.01)

(52) U.S. Cl. ........................................... 375/340

(58) Field of Classification Search ................ 375/340, 375/316, 343, 295, 259, 229, 219, 377, 143, 375/152, 148, 147, 141, 142, 140, 130, 346, 375/348; 370/320, 315, 310, 319, 316, 441, 370/431, 342, 335, 329, 328; 329/320, 319, 329/315, 318, 349, 347; 379/340, 416, 414, 379/338, 398; 455/63.1, 39, 296, 130
See application file for complete search history.

(56) References Cited

U.S. PATENT DOCUMENTS

| 5,303,263 | A | * | 4/1994 | Shoji et al. ................. 375/229 |
| 5,557,644 | A | * | 9/1996 | Kuwabara .................... 375/340 |
| 6,011,812 | A | * | 1/2000 | Laakso et al. ............... 375/152 |
| 6,044,083 | A |  | 3/2000 | Citta et al. |
| 6,084,907 | A | * | 7/2000 | Nagano et al. .............. 375/230 |
| 6,088,383 | A | * | 7/2000 | Suzuki et al. ................ 375/148 |
| 6,167,082 | A | * | 12/2000 | Ling et al. ................... 375/233 |
| 6,477,208 | B1 | * | 11/2002 | Huff ............................ 375/265 |
| 6,690,715 | B2 | * | 2/2004 | Webster et al. .............. 375/148 |
| 6,804,217 | B1 | * | 10/2004 | Miyatani et al. ............ 370/335 |
| 6,836,507 | B1 | * | 12/2004 | Gifford et al. ............... 375/150 |
| 6,856,590 | B2 | * | 2/2005 | Okada et al. ................ 370/208 |
| 6,961,371 | B2 | * | 11/2005 | Wang, et al. ................ 375/229 |

FOREIGN PATENT DOCUMENTS

WO WO 02/29998 A1 4/2002

OTHER PUBLICATIONS

Marco Lops, Member, IEEE, Giuseppe Ricci, and Antonia Maria Tulino; *Narrow-Band-Interference Suppression in Multiuser CDMA Systems*, Sep. 1998; pp. 1163-1175.
Jeffrey A. Young, Member, IEEE, and James S. Lehnert, Senior Member, IEEE; Analysis of DFT-Based Frequency Excision Algorithms for Direct-Sequence Spread-Spectrum Communications; Aug. 1998; pp. 1076-1087.

* cited by examiner

*Primary Examiner*—Pankaj Kumar
(74) *Attorney, Agent, or Firm*—McAndrews Held & Malloy, Ltd.

(57) ABSTRACT

The present invention relates a system and method for mitigating impairment in a communication system. In one embodiment, the system includes a transmitter adapted to transmit at least one signal and a receiver adapted to receive the at least one signal and mitigate inter code interference in the signal using at least one inter code interference coefficient.

8 Claims, 7 Drawing Sheets

CHANNEL EQUALIZATION WITH SCDMA MODULATION

CROSS-REFERENCE TO RELATED APPLICATIONS

This application is a continuation-in-part of, and claims the benefit of and priority from, application Ser. No. 10/000,415 filed Nov. 20, 2001, titled "Detection and Mitigation of Temporary Impairments in a Communications Channel", which is related to, and claims the benefit of and priority from, Provisional Application No. 60/296,884 filed Jun. 8, 2001, titled "Detection and Mitigation of Temporary Impairments in a Communications Channel", the complete subject matter of each of which is incorporated herein by reference in its entirety.

FEDERALLY SPONSORED RESEARCH OR DEVELOPMENT

Not Applicable

SEQUENCE LISTING

Not Applicable

MICROFICHE/COPYRIGHT REFENENCE

Not Applicable

BACKGROUND OF THE INVENTION

The present invention relates to communications systems, all of which are inherently limited in their capacity (or rate) of information transfer by channel impairments. More specifically, the present invention relates to channel equalization in information transfers between a plurality of Cable Modems (alternatively referred to as "CM") and a Cable Termination System (alternatively referred to as "CMTS" or "headend").

Communication systems are subjected to impairments, generally of a brief or transitory duration. One example of such impairment is often referred to by the generic term "noise." Noise sometimes emanates for example, from within electrical components themselves, such as amplifiers and even passive resistors. Another example of such impairment is referred to as "interference," which is usually taken to be some unwanted manmade emission, from another communications system such as radio or from switching circuits in a home or automobile for example. "Distortion" is a yet another example of such impairment, and includes linear distortion in the channel, such as pass-band ripple or non-flat group delay for example, and nonlinear distortion, such as compression in an overdriven amplifier for example. It is contemplated that there are many other types of impairments that may also adversely affect communications in a channel.

Often, such impairments may by dynamic in nature. In many cases, the impairment may be at one level of severity most of the time. In this instance, the communications system may be designed or optimized in some fashion to operate at that specific level of impairment. Occasionally, however, one or more of the impairments may become so severe as to preclude the operation of such communications system optimized for the more ordinary level of impairments.

Previously, when a large interference or burst of noise occasionally impinged upon the receiver (a CM for example), it is known to simply blank out the received signal to mitigate such large out-of-the ordinary bursts of received power. Often, analog processing means are used, almost at, if not right at, the receiver input. This may be done especially to protect CMs or other sensitive receiver front-ends from damage. While this technique may provide some benefit in circumstances where the noise or interference power dwarfs the signal-of-interest power, it does not protect against the many other impairments that have power more on the order of the signal-of-interest power (or even much less). Thus blanking does not, by itself, provide the receiver with a means to improve its overall performance in the presence of the lost information, i.e., the information content concurrent with the large noise burst.

One known technique, a forward error correction technique (alternatively referred to as "FEC") has been applied, even unknowingly, to solve this problem. FEC techniques incorporate soft-decision decoding, such as is common with convolutional error correction codes and the Viterbi decoding algorithm. In such correction techniques, as the error power in the received signal increases, such increase is passed directly into the decision process.

Such encoding and decoding techniques have been in common practice for years, and are widely applied without thought to temporary fidelity changes in the channel. Fortunately, in the event of a change in the channel fidelity, the soft-decision decoding takes into consideration the larger error power in making signal decisions. However, unfortunately, often with a change in channel conditions, there is duration of multiple symbol intervals (in a digital communications system for example) where the degradation persists. During this time some symbols may be so severely erred that they actually appear close to another possible (but wrong or incorrect) symbol. In such event, the soft-decision decoder actually "thinks" it has received a low error power, and may rate the wrong signal with a high confidence. This becomes much more likely as the constellation density (of a QAM constellation for example) is increased for high rate communications, Additional techniques, such as a Time Division Multiple Access technique (alternatively referred to as "TDMA") have been applied to solve this problem. In this technique, one or more carrier frequencies are shared among a plurality of CMs. Known standards, DOCSIS 1.0 and 1.1 for example, each of which are incorporated herein in their entirety, define the physical layer, and additional layers, in which a plurality of CMs transmit data upstream to and receive data downstream from the CMTS or headend. In this technique, each upstream carrier frequency or channel assignment is generally shared by a plurality of CMs, each being granted time slots wherein they may use the channel. These grants are allocated and made known to the CMs via the downstream broadcast transmissions. Some of the grants only enable a single CM to transmit, while other time slot grants are in contention mode. That is some, or all, of the CMs may attempt to use the grant. However, if more than one CM attempts to use a grant in the contention mode, all the CMs will likely be unsuccessful in channel use.

Yet another technique, such as a direct-sequence spread-spectrum modulation technique discussed by J. Young and J. Lehnert, in their paper titled "Analysis of DFT-Based Frequency Excision Algorithms for Direct-Sequence Spread-Spectrum Communications," *IEEE Trans. Comm.*, vol. 46, pp. 1076-1087, August 1998, the complete subject matter of which is incorporated herein by reference in its entirety, has also been applied to solve this problem. In this technique, frequency excision is used to eliminate narrow-band energy, thus enhancing the capacity of direct-sequence spread-spectrum modulation to reject narrow-band interference. However, this disclosed technique focuses on particular waveforms having energy concentrated about a narrow band.

Yet still another technique, such as a Code-Division Multiple Access technique (alternatively referred to as "CDMA") discussed by M. Lops, G. Ricci and A. Tulino, in their paper titled "Narrow-Band-Interference Suppression in Multiuser CDMA Systems," *IEEE Trans. Comm.*, vol. 46, pp. 1163-1175, September 1998, the complete subject matter of which is incorporated herein by reference in its entirety, has also been applied to solve this problem. In this technique, a decision is made regarding the bit(s) transmitted by each user over a communication system. This decision is based on the projection of the observables on to the orthogonal complement to the subspace spanned by the other users' signatures and the narrow-band interference. The disclosed technique recognizes that the blanking and iterative processing may be performed with an orthogonal basis set decomposition of the frequency domain.

A further technique, such as a Synchronous Code Division Multiple Access technique (alternatively referred to as "SCDMA") relates to a spreading technique to transmit symbols at the same time on the same frequency. More specifically, this technique may be used, in one embodiment, with a DOCSIS 2.0 physical layer standard (alternatively referred to as the "DOCSIS standard"), which is incorporated herein by reference in its entirety. The DOCSIS standard defines the physical layers in which pluralities of CMs transmit data upstream to and receive data downstream from the CMTS or headend.

For such SCDMA technique to work efficiently, all the spreading codes must be synchronized as they arrive at the receiver. Timing misalignments may result in inter code interference (alternatively referred to as "ICI"), which may degrade performance. It is contemplated that due to echoes in the channel impulse response, the spreading codes may no longer be orthogonal at the receiver; ICI is introduced by the delayed (echoed) versions of the codes, which are after all, similar to severely mistimed codes. Various channel impairments may also degrade performance, and special receiver techniques may be employed to limit or mitigate the degradation caused by such channel performance.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a system and method for mitigating impairment in a communication system. In one embodiment, the communication signal comprises a transmitter adapted to transmit at least one signal and a receiver adapted to receive the at least one signal and mitigate inter code interference in the signal using at least one inter code interference coefficient.

Features of the present invention further may be found in a receiver. In one embodiment, the receiver comprises at least one matched filter adapted to generate at least one matched filter output and an equalizer adapted to generate at least one soft decision using the at least one matched filter output. In another embodiment, the receiver comprises at least one matched filter adapted to generate up to 128 matched filter outputs using a demodulated signal and at least one adaptive equalizer adapted to output up to 128 ICI-eliminating coefficients.

Yet another embodiment of the present invention relates to a method of mitigating impairment in a signal. In this embodiment, the method comprises producing at least one matched filter output from at least one demodulated signal and determining at least one ICI-eliminating coefficient using the at least one matched filter output. The at least one ICI-eliminating coefficient is used to mitigate inter code interference in the signal.

These and other advantages and novel features of the present invention, as well as details of an illustrated embodiment thereof, will be more fully understood from the following description and drawings.

DETAILED DESCRIPTION OF THE INVENTION

Figure 1:
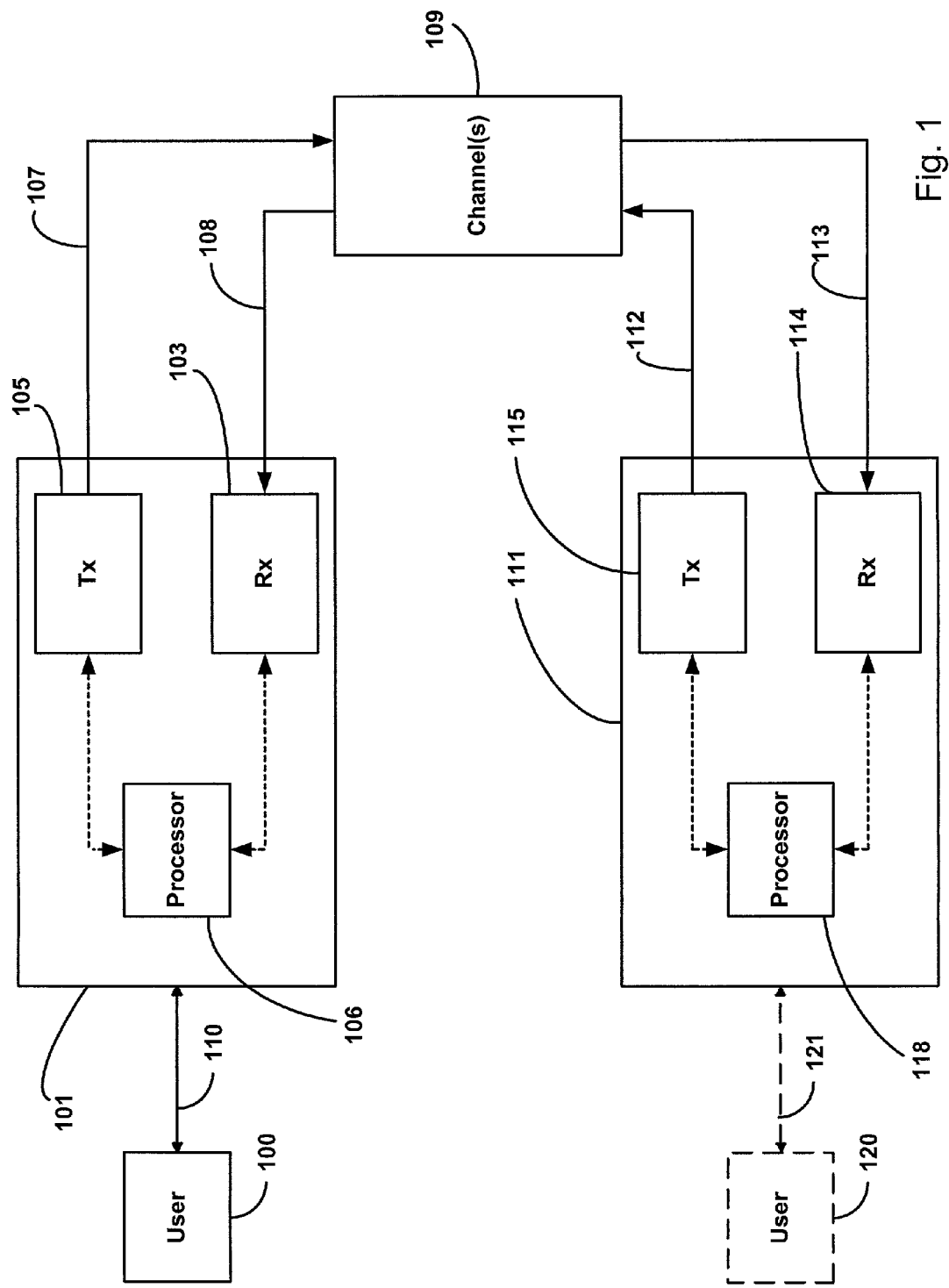
FIG. 1 illustrates a block diagram of a generic communication system that may be employed in connection with the present invention.

The following description is made with reference to the appended figures.

One embodiment of the present invention relates to a spreading technique to transmit symbols at the same time on the same frequency. More specifically, one embodiment of the present invention relates to a SCDMA communication. More specifically, this invention relates to SCDMA communications used, in one embodiment, with a DOCSIS 2.0 physical layer standard (alternatively referred to as the "DOCSIS standard"), which is incorporated herein by reference in its entirety. The DOCSIS standard defines the physical layers in which pluralities of CMs transmit data upstream to and receive data downstream from the CMTS or headend.

In one embodiment of the present invention using SCDMA, up to 128 spreading codes are available for modulating each upstream-transmitted symbol. In this embodiment, up to 128 symbols may be transmitted simultaneously, each symbol using its own spreading code. Each spreading code consists of a sequence of +1 or −1 valued chips, such that there are up to 128 such chips in each spreading code. In this embodiment, the symbol amplitude and angle are modulated using a vector, applying the vector or its additive inverse (i.e., 180 degree rotation) to the symbol.

In one embodiment, the spreading codes are orthogonal if perfectly time-aligned, and thus the 128 symbols will not interfere with each other, even though they are transmitted at the same time on the same channel. For example, two waveforms are orthogonal to each other if, after multiplying them by each other and integrating, the result of the integration is zero. In SCDMA used with one embodiment of the present invention, at least one but up to 128 spreading codes may be used at one time. These spreading codes may be allocated to one CM, such that that CM is granted all the spreading codes (128 for example), up to and including the spreading codes being allocated to 64 different CMs, such that two spreading codes are granted to each CM. QAM symbols of two bits per symbol and more are spread with the assigned codes, one spreading code per QAM symbol, although other arrangements are contemplated.

In one embodiment using SCDMA, the spreading codes may be cyclical shifts of one 127-chip spreading code, plus one additional chip. Thus, in this embodiment, the spreading codes are nearly cyclical shifts of one another.

For SCDMA to work efficiently, all the spreading codes should be synchronized as they arrive at the receiver. Timing misalignments result in ICI, which may degrade signal performance. It is contemplated that the spreading codes may no longer be orthogonal at the receiver, owing to ICI from the lack of orthogonality among such codes. One embodiment of the present invention relates to mitigating, if not eliminating, such lack of orthogonality. The invention relates to setting up equations to determine the coefficients for equalization (i.e., ICI-eliminating coefficient) and reducing such ICI. In one embodiment of the present invention, such coefficients for equalization may be determined using a matrix multiplication for minimizing ICI given estimates of the ICI. Another embodiment of the present invention relates to arranging the receiver processing so that an efficient implementation, similar to a traditional blind adaptive equalizer for a single-carrier receiver, may be used to achieve a nearly optimal performance.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. The communication nodes may be, for example, cable modems, DSL modems or any other type of transceiver device that transmits or receives data over one or more channels (generally referred to as CMs).

The first communication node 101 comprises a transmitter 105, a receiver 103 and a processor 106. The processor 106 may comprise, for example, a microprocessor. The first communication node 101 communicates with or is communicatively coupled to a user 100 (e.g., a computer) via communication link 110, and to the channel 109 via communication links 107 and 108. Of course, communication links 107 and 108 may be combined into a single communication link.

Similarly, the second communication node 111 comprises a transmitter 115, a receiver 114 and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may also be combined into a single communication link. The communication node 111 may also be communicatively coupled to a user 120 (again a computer, for example) via communication link 121. In the case when communication node 111 is a headend, for example, user 120 may not be present.

During operation of the illustrated embodiment of FIG. 1, the user 100 may communicate information to the user 120 (or the headend) using the first communication node 101, the at least one channel 109 and the second communication node 111. Specifically, the user 100 communicates the information to the first communication node 101 via communication link 110. The information is transformed in the transmitter 105 to match the restrictions imposed by the at least one channel 109. The transmitter 105 then communicates the information to the at least one channel 109 via communication link 107.

The receiver 114 of the second communication node 111 receives, via communication link 113, the information from the at least one channel 109 and transforms it into a form usable by the user 120. Finally, the information is communicated from the second communication node 111 to the user 120 via the communication link 121.

Communication of information from user 120 to user 100 may also be achieved in a similar manner. In either case, the information transmitted/received may also be processed using the processors 106/118.

Figure 2:
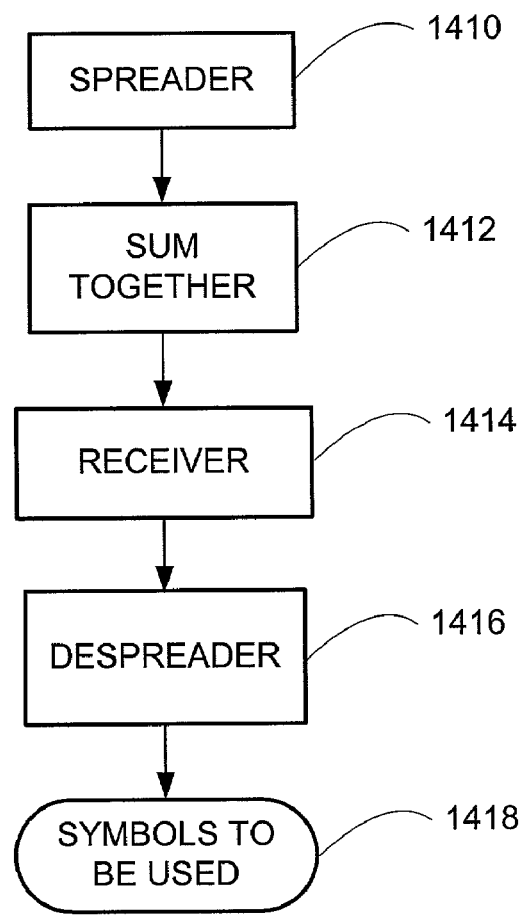
FIG. 2 illustrates a flow diagram illustrating one embodiment of SCDMA transmitter and receiver operation in accordance with the present invention.

FIG. 2 illustrates an embodiment of SCDMA transmitter and receiver operation in accordance with one embodiment of the present invention. In this embodiment, the illustrated method uses at least one spreader to apply the spreading code to the waveform, signal or chip as illustrated by block 1410. Although only one spreader is discussed, it is contemplated that a transmitter may contain 128 spreaders, or that the spreaders may be allocated among one or more transmitters; for example, one transmitter may contain 40 spreaders and a second transmitter may contain 88 spreaders.

The product is then summed as illustrated by block 1412. The summed signals are then transmitted to, and received by a receiver as illustrated by block 1414. The signals are despread as illustrated by block 1416, using at least one despreader, which provides the symbols to be used as illustrated by block 1418. In one embodiment, it is contemplated that a single receiver may contain up to 128 despreaders, although the despreaders may be allocated among two or more receivers.

Figure 3:
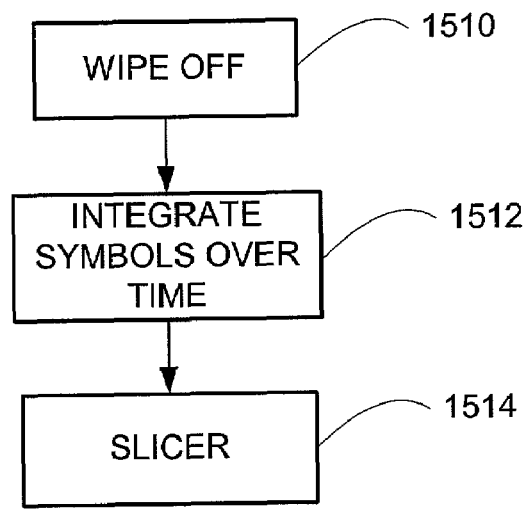
FIG. 3 illustrates a flow diagram illustrating one embodiment of a dispreading method that may be employed in accordance with the present invention.

FIG. 3 illustrates a flow diagram illustrating one embodiment of a despreading method that may be employed using a despreader similar. The despreader wipes off the spreading code of the symbol, signals, chips, waveforms, etc. as illustrated by block 1510. The values are integrated over time as illustrated by block 1512 and inputted to at least one slicer as illustrated by block 1514. It is contemplated that wiping off the spreading code and integrating over the duration of the spreading code produces a value at the slicer input that is close to the value in an ideal system, which would, in one embodiment, be the original spread signal at the transmitter plus some code. However, this value may include some ICI from the other symbols that may not be orthogonal.

It is contemplated that the spreading codes as provided previously may no longer be orthogonal at the receiver, owing to ICI from the lack of orthogonality among such codes. One embodiment of the present invention relates to mitigating, if not eliminating, such lack of orthogonality.

This embodiment relates to setting up equations to determine the coefficients for equalization (i.e., ICI-eliminating coefficients) and reducing such ICI. In this embodiment, such coefficients for equalization may be determined using matrix multiplication for minimizing the ICI given estimates of the ICI (i.e., the cross-correlation coefficients of the spreading codes in the channel).

Figure 4:
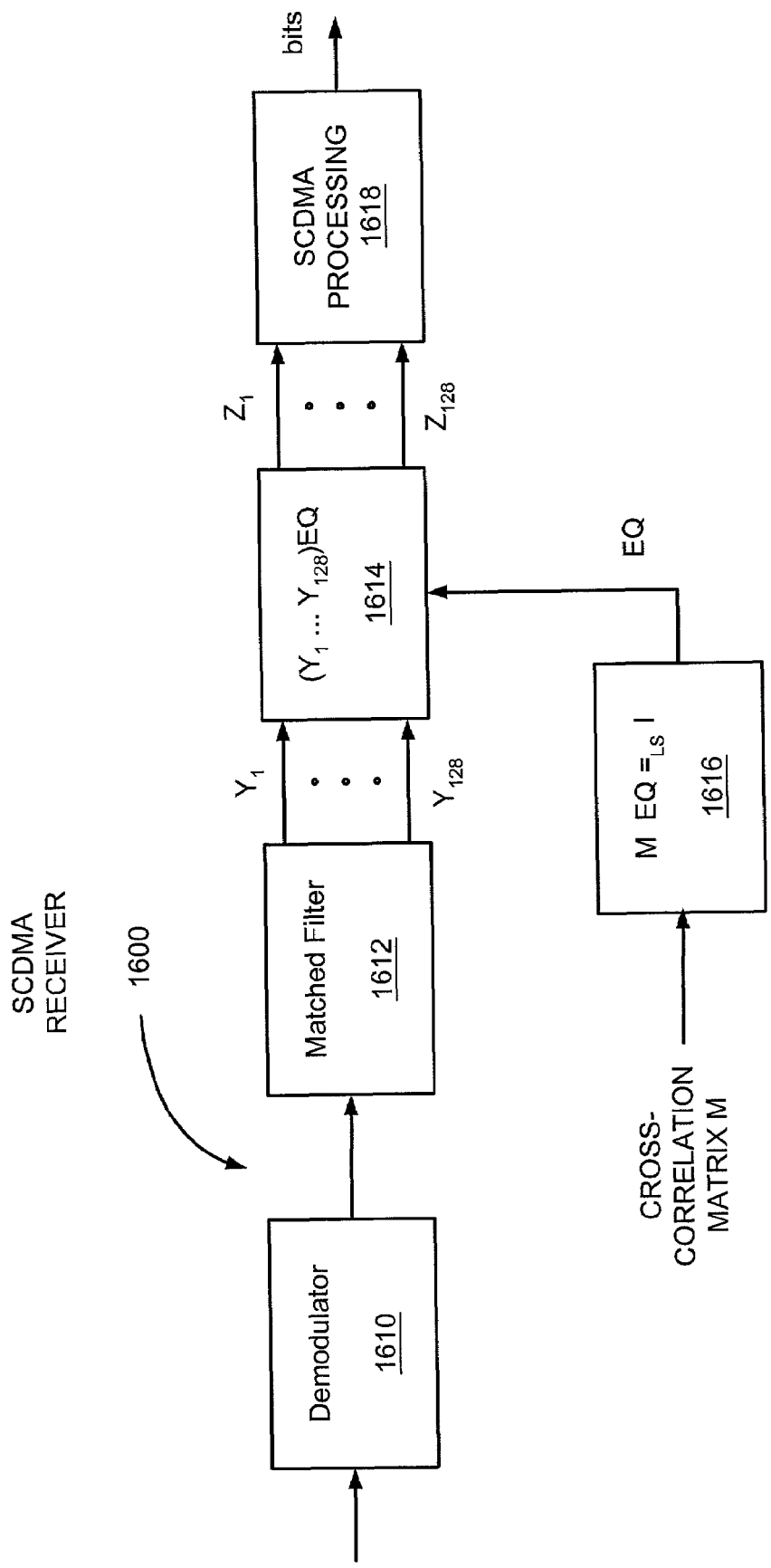
FIG. 4 illustrates a block diagram of one embodiment of a SCDMA receiver in accordance with the present invention.

FIG. 4 illustrates a block diagram of one embodiment of an SCDMA receiver according to the present invention. It is contemplated that such SCDMA receiver may be used in any of the channels or systems discussed previously. The SCDMA receiver, generally designated 1600, is adapted to provide channel equalization, mitigating the lack of orthogonality among the SCDMA spreading codes using, for example, coefficients for equalization. It is contemplated that the present SCDMA receiver may be used with at least one but generally multiple symbols transmitted at one time.

The receiver 1600 comprises a demodulator 1610 adapted to receive and demodulate the at least one modulated transmitted symbol or signal using one or more spreading codes as provided previously. The demodulator 1610 is communicatively coupled to at least one matched filter 1612 (for 128 spreading codes for example), adapted to output one or more Y matched filter outputs. In one embodiment of the present invention, the matched filter is adapted to isolate each demodulated transmitted symbol from all the other symbols.

The matched filter 1612 is communicatively coupled to an equalizer 1614, which is adapted to receive such Y matched filter output(s). In the illustrated embodiment, the equalizer 1614 is adapted to receive up to about 128 Y matched filter outputs, $Y_1$ through $Y_{128}$ for example. In one embodiment, the equalizer 1614 post multiplies the Y matched filter output(s) by the vector "EQ", yielding a row vector of one or more Z ICI-reduced symbol soft decision(s) for one or more particular spreading codes. In this embodiment, vector device 1616 determines the matrix column vectors "EQ" using the least squares criterion, given the cross-correlation coefficients for the spreading codes in a channel in matrix M. In solving this least square problem as illustrated in block 1616, the right hand side of the equation is the identity matrix.

Equalizer 1614 is illustrated communicatively coupled to one or more SCDMA processing devices 1618, which is adapted to receive the at least one Z ICI soft decisions ($Z_1$ up to about $Z_{128}$ for example) and provide channel equalization, mitigating the lack of orthogonality among the SCDMA spreading codes by reducing or mitigating the ICI in the SCDMA spreading code. In the illustrated embodiment, the SCDMA processing device 1618 is adapted to output one or more bits with reduced ICI in the SCDMA spreading code.

Figure 5:
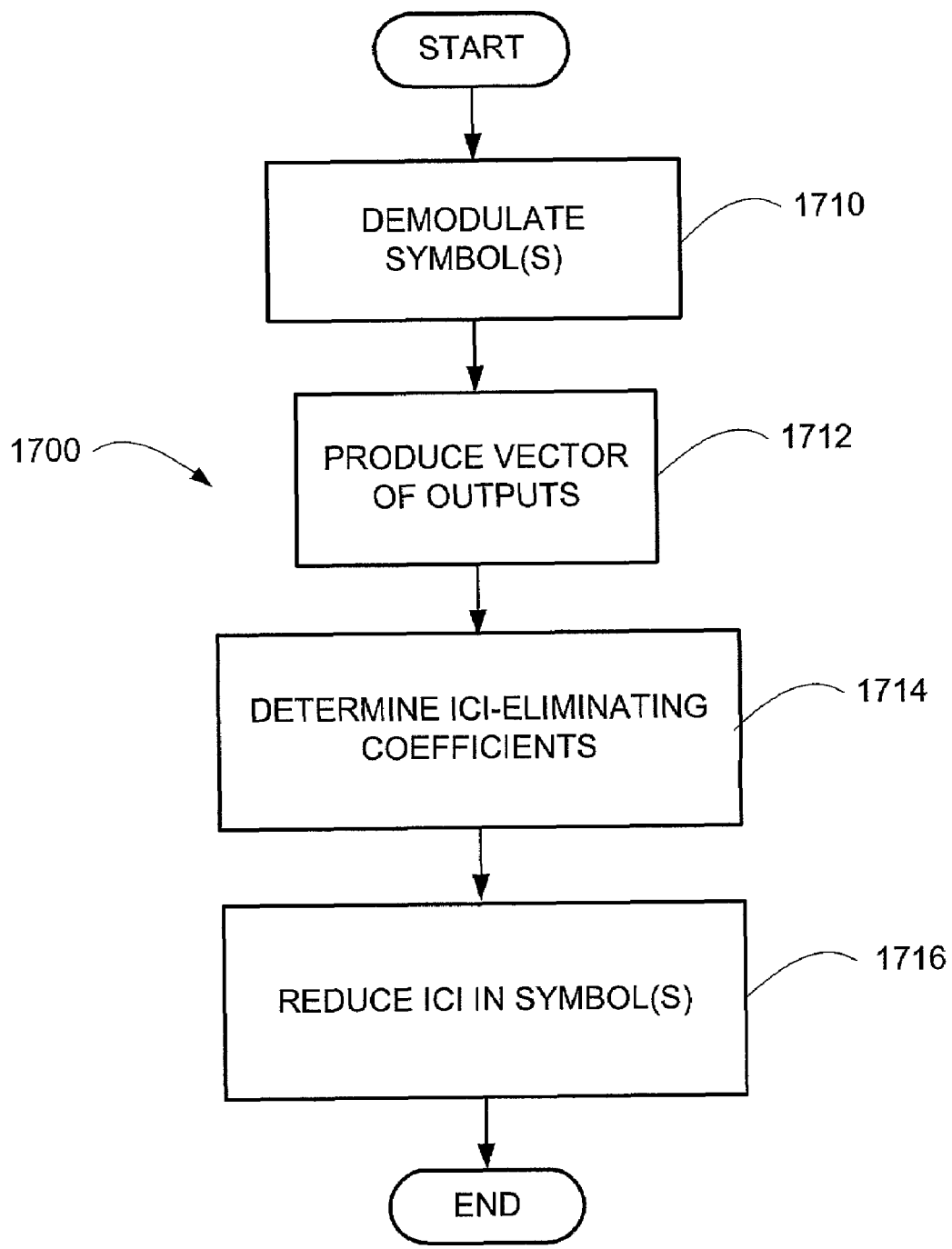
FIG. 5 illustrates a flow diagram illustrating one embodiment of a method for finding the coefficients of equalization and thus reducing ICI using a receiver similar to that illustrated in FIG. 4 in accordance with the present invention.

FIG. 5 illustrates a flow diagram illustrating one embodiment of a method, generally designated 1700, for finding the coefficients of equalization and thus reducing the ICI using a SCDMA receiver similar to that provided previously. This method comprises demodulating the at least one received modulated transmitted symbols or signals using one or more spreading codes as illustrated by block 1710.

A vector of outputs is produced as illustrated by block 1712. In one embodiment, one or more matched filters for 128 spreading codes are used to output one or more Y matched filter outputs, $Y_1$ through $Y_{128}$ for example.

The method further comprises finding ICI-eliminating coefficients, and making ICI-reduced soft decisions on such Y matched filter outputs as illustrated by block 1714. More specifically, finding such ICI-eliminating coefficients comprises determining the coefficients of equalization. In this embodiment, a matrix M comprising the cross-correlation coefficients for the spreading codes in the channel is used to solve for a matrix of column vectors "EQ". One particular column is "$eq_k$". In this embodiment, M is 126 by 126 if 126 spreading codes are used and is 128 by 128 if 128 spreading codes are used. For example, where the coefficient in a row I and a column J shows the coupling of the code J symbol onto the code I matched filter output, solving for column vector "$eq_k$" in the Least Squares sense provides the vector "$eq_k$", that multiplies the vector of the at least one but up to and including 128 Y matched filter outputs (one per spreading code), to yield the estimate of the symbol carried with spreading code K as follows:

$$M\ eq_k =_{LS} (0\ 0\ \ldots\ 0\ 1\ 0\ \ldots\ 0)^T$$

[the single "1" is in the Kth row of the vector on the right hand side of the equation]

In one embodiment, it is contemplated that more than one transmitter may be used to communicate with the SCDMA receiver. When multiple transmitters are operating, each transmitter using a different subset of the spreading codes, it is contemplated that the cross correlation matrix M is made up of the rows of each transmitter's matrix M corresponding to that transmitter's allocated codes.

In full form, assuming 126 of the 128 spreading codes are used for example, solving the matrix equation in the Least Squared sense provides the full compensation matrix EQ which post multiplies a row vector of the 126 matched filter outputs to yield the row vector of the 126 ICI-reduced symbol soft decisions, as follows:

$$M\ EQ =_{LS} I_{126 \times 126}$$

Thus, for this example, the ICI-reduced soft decision may be determined as follows:

$$(y1, y2, \ldots y126) EQ = (z1, z2, \ldots z126)$$

where $y_p$ is the matched filter output for the $p^{th}$ spreading code, and $Z_q$ is the ICI-reduced soft decision for the $q^{th}$ spreading code. IF M is invertible, then it may be shown that $EQ = M^{-1}$.

The method further comprises reducing the ICI using one or more SCDMA processing devices as illustrated by block 1716. This results in one or more symbols with reduced ICI in the SCDMA spreading code being outputted.

Another embodiment of the present invention relates to arranging the receiver processing so that an efficient implementation similar to a traditional blind adaptive equalizer for a single-carrier receiver may be used to achieve nearly optimal performance. In one embodiment, such efficient implementation may be accomplished by taking advantage of the nearly cyclical nature of the spreading codes in SCDMA. Given a set of agreed upon symbols for the spreading codes (symbols that are agreed upon by the transmitter and receiver, for example), a receiver using an equalizer structure may operate as a single-carrier equalizer in training mode, starting or initializing the equalizer using SCDMA modulation. Initializing the equalizer using SCDMA eliminates the need, in one embodiment, to operate in a TDMA mode to estimate the channel response.

Owing to the cyclical nature of the SCDMA spreading codes, it is assumed, in this embodiment, that the echoes in the channel response span only a handful of chips as provided previously. Thus it is contemplated that the matrix M of the cross-correlation values is largely band-diagonal. Based on such assumptions, each row in the matrix M will have mostly negligible entries (and the non-zero coefficients may be significantly less than 128).

Further, is it presumed that the rows of the matrix M are cyclic shifts of each other, rather than a dropping off. This presumption is not exact as the codes are not perfectly cyclical, in addition to having "end effects" at the beginning and end of the spreading frame, In this embodiment it is contemplated that each row of the matrix M is a circular, cyclical shift of each other row (sequential moving down the rows in the matrix). It is further contemplated that the solutions "$EQ_k$" are circular, cyclical shifts of each other as well. From this, it is contemplated that the vector of outputs from the SCDMA matched filter may be ordered or sequenced (over time for example), and operated into a serialized, single carrier FIR adaptive equalizer structure. It is also contemplated that fewer than 128 spreading codes may be used in such serialized, single carrier adaptive equalizer structure.

Figure 6:
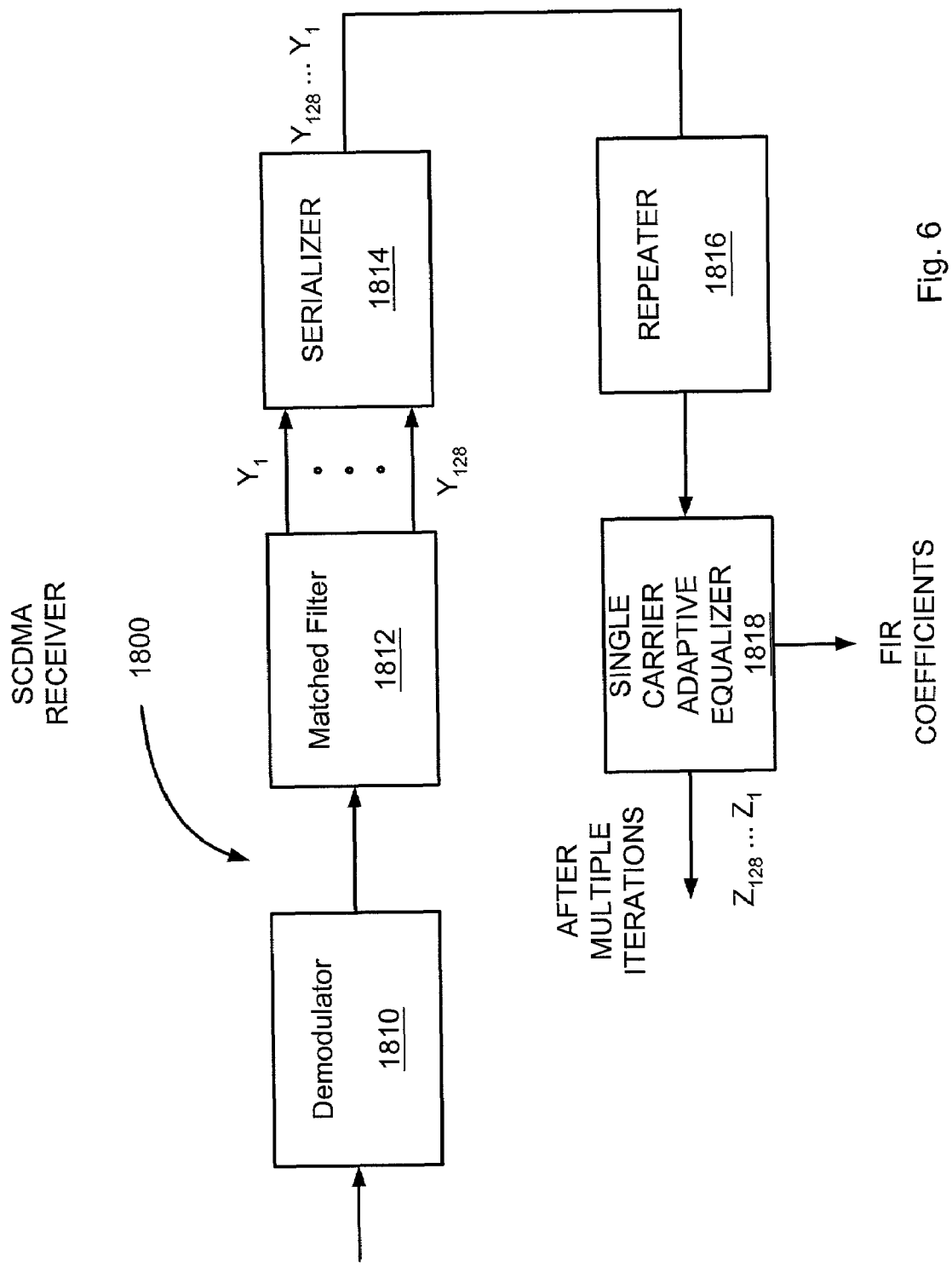
FIG. 6 illustrates a block diagram of another embodiment of a SCDMA receiver according to the present invention.

FIG. 6 illustrates a block diagram of another embodiment of an SCDMA receiver using computational efficient channel equalization according to the present invention. Again, it is contemplated that such receiver may be used in any of the communication channels or systems discussed previously. In this embodiment, the SCDMA receiver, generally designated 1800, is adapted to provide equalization processing similar to a traditional blind adaptive equalizer for a single-carrier receiver. The receiver 1800 comprises a demodulator 1810 adapted to receive and demodulate the at least one modulated transmitted symbols or signals having one or more spreading codes as provided previously. The demodulator 1810 is communicatively coupled to at least one matched filter 1812 (for 128 spreading codes for example), adapted to output one or more Y matched filter output(s) ($Y_1$ up to about $Y_{128}$ for example).

The matched filter 1812 is illustrated as communicatively coupled to a serializer 1814, which is adapted to receive such Y matched filter output(s). In the illustrated embodiment, the serializer 1814 is adapted to order or sequence the Y matched filter output(s). In the illustrated embodiment, the Y matched filter outputs are sequenced over time forming $Y_{128}, Y_{127}, \ldots Y_1$ for example).

In the illustrated embodiment, the serializer 1814 is communicatively coupled to a repeater and single carrier adaptive equalizer (N taps FIR), 1816 and 1818 respectively. Operating an adaptive equalizer for many iterations, driven by the serialized outputs of the serializer 1814 ($Y_{128}, Y_{127}, \ldots Y$, for example) provides a simple means for finding or determining the ICI-eliminating coefficients and thus reducing the ICI in SCDMA with short response channels.

The adaptive equalizer 1818 is adapted to output FIR coefficients and, after one or more iterations, one or more Z ICI-reduced symbol soft decision(s) ($Z_{128}, Z_{127}, \ldots Z_1$ for example). In this embodiment, the FIR coefficients may be communicated to a transmitter for either code-domain or chip-time-domain pre-equalization. In one embodiment, the equalizer 1818 may begin in a training mode as is normal with a single-carrier equalizer with known preamble symbols, if such a set of known symbols is provided for the SCDMA case.

Figure 7:
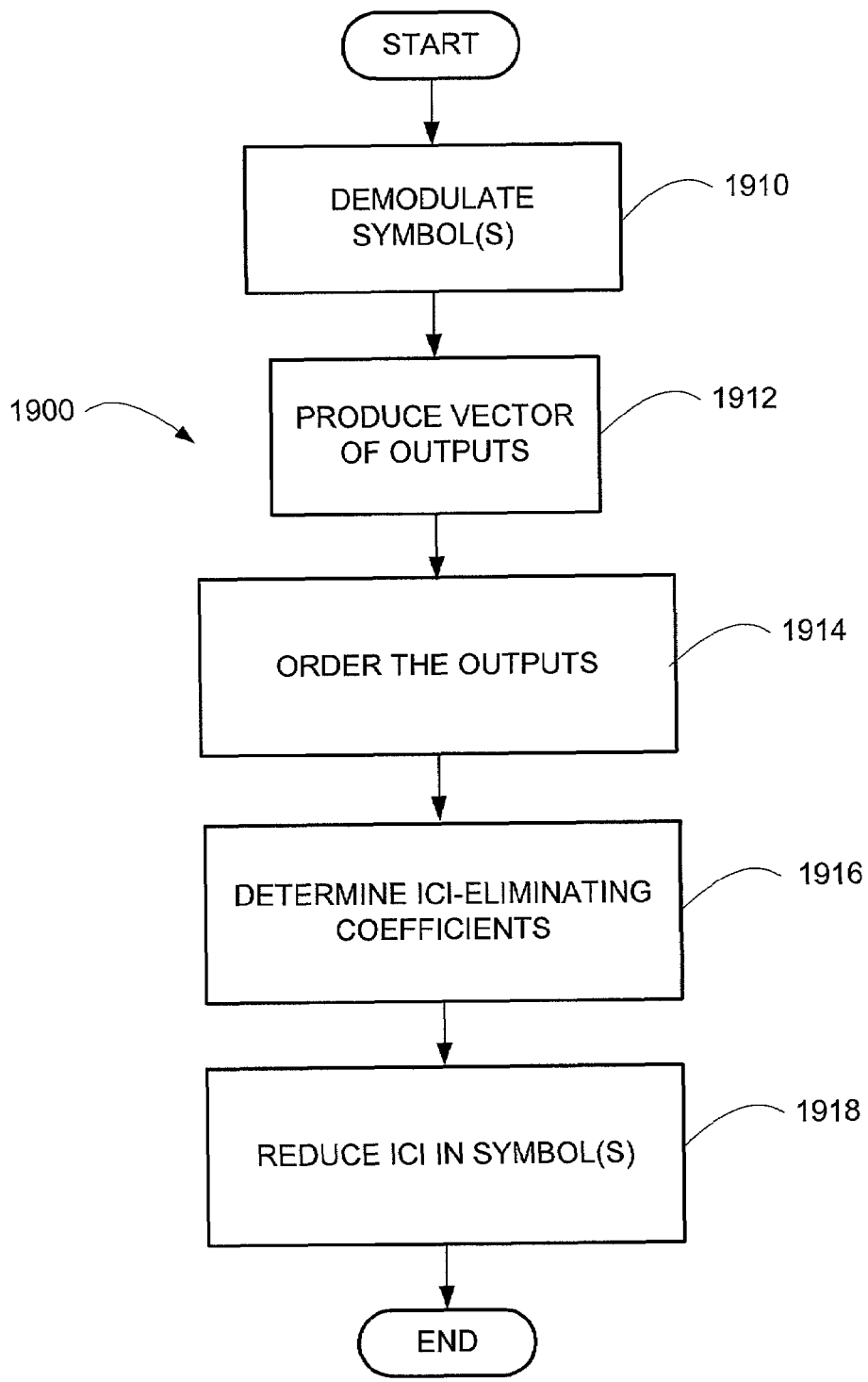
FIG. 7 illustrates a flow diagram illustrating one embodiment of a computational efficient method for finding the coefficients of equalization and thus reducing ICI using a system similar to that illustrated in FIG. 6 in accordance with the present invention.

FIG. 7 illustrates a flow diagram illustrating one embodiment of a method, generally designated 1900, for determining the coefficients of equalization (the ICI-eliminating coefficients) and thus reducing the ICI using a SCDMA receiver similar to that provided previously. The method comprises demodulating the at least one received modulated transmitted symbols or signals, including one or more spreading codes, as illustrated by block 1910.

A vector of outputs is produced as illustrated by block 1912. In one embodiment, one or more matched filters are used to output one or more Y matched filter outputs ($Y_1$ through $Y_{128}$ for example). Such outputs are ordered or sequenced as illustrated by block 1914. In this embodiment, the outputs are sequenced over time.

The method further comprises determining ICI-eliminating coefficients, and making ICI-reduced soft decisions on such Y matched filter outputs, and reducing the ICI in the signals or symbols as illustrated by blocks 1916 and 1918 respectively. More specifically, finding such ICI-eliminating coefficients comprises determining the coefficients of equalization using an adaptive equalizer, for example.

In this embodiment it is contemplated that each row of the matrix M is a circular, cyclical shift of each other row (sequential moving down the rows in the matrix) as provided previously. It is further contemplated that the solutions "$EQ_k$" are circular, cyclical shifts of each other as well. From this, it is contemplated that the vector of outputs from the SCDMA matched filter may be ordered or sequenced (over time for example), and operated into a serialized, single carrier FIR adaptive equalizer structure.

It is contemplated that the equalizer may either wrap the input sequence "around" or equivalently realize many copies of the sequence end-to-end to impart the circular cyclic nature of the sequence. Also, in this fashion, at least one but multiple iterations of the input sequence may be used to converge the adaptive equalizer.

In previous embodiments, the channel is equalized at the receiver (similar to receivers 1600 or 1800). In another embodiment, the channel is equalized at the transmitter. It is contemplated that the tap coefficients as provided previously may be communicated to the transmitter. The transmitter may employ pre-equalization by creating an equivalent "EQt" matrix from the equalizer taps, where EQt matrix multiples the transmitter symbols to accomplish pre-equalization. The receiver equalizer taps may become columns in the EQt matrix.

However, it is contemplated that applying the same equalizer FIR to the chip sequence outputted by the transmitter performs nearly the same operation, again owing to the nearly cyclical shift property of the SCDMA codes. Delaying the signal for a single spreading code and multiplying it by complex number "α," for example, is nearly equivalent to adding the next adjacent spreading code, with the same input symbol as the first, but scaled by "α". Some differences between these two operations include the absence of the first chip, the bleed of the last chip into the next spreading frame, and possibly the value of the second chip (depending on the value of the second chip in the latter code). Thus, applying the ICI-repairing, serialized equalizer structure from the receiver as a true, chip-time-domain FIR equalizer at the transmitter, provides equalization which is close to that which would be provided by applying the equalization matrices at the receiver.

It is further contemplated that, when $EQ=M^{-1}$ as provided previously, M EQ commutes such that the ICI-repair may be applied at the transmitter. For example, if there were 5 non-zero coefficients in the equalizer (i.e., in each column of EQ), then the transmitter would have to actually transmit four more codes than it was allocated, in order to yield the proper ICI-mitigation in the codes it was assigned. It is contemplated that the spreading codes allocated to the transmitter are adjacent in a cyclical series. It is also contemplated that these additional codes may be dangerous for another transmitter to attempt to use, since the additional codes may not be properly compensated at the receiver. This is analogous to a time-domain-chip FIR filter at the transmitter side, which is actually transmitting additional spreading codes by delaying scaled versions of the code. One difference is that in the latter case the resulting transmission actually slips out of the frame boundaries, Many modifications and variations of the present invention are possible in light of the above teachings. Thus, it is to be understood that, within the scope of the appended claims, the invention may be practiced otherwise than as described hereinabove.

The invention claimed is:

1. A communication system for receiving at least two signals, comprising:
 a receiver adapted to receive the signals and mitigate interference due to a lack of orthogonality in spreading codes that spread said signals using at least one inter-code interference coefficient, wherein said receiver further comprises an equalizer adapted to receive at least one matched filter output and output an ICI-reduced symbol soft decision, and where said equalizer is further adapted to post multiply said at least one matched filter output by a vector EQ.

2. The system of claim 1, wherein said receiver further comprises a demodulator adapted to demodulate the signals.

3. The system of claim 1, wherein said receiver further comprises at least one matched filter adapted to output said at least one matched filter output.

4. The system of claim 1, wherein said receiver further comprises a serializer adapted to receive at least one matched filter output and sequence said at least one filter output.

5. The system of claim 1, wherein said adaptive equalizer is adapted to output at least one ICI-eliminating coefficient.

6. The system of claim 1, wherein the interference due to a lack of orthogonality in spreading codes that spread said signals occurs due to the delay of one of the signal with respect to others of the signals.

7. The system of claim 1, wherein said transmitter is adapted to pre-equalize the signals.

8. The system of claim 7, wherein said transmitter is further adapted to create an EQt matrix used to pre-equalize the signals.

* * * * *